Patented Jan. 22, 1952

2,583,435

UNITED STATES PATENT OFFICE 2,583,435

HIGH-TEMPERATURE GREASE

Arnold J. Morway, Rahway, N. J., assignor to Standard Oil Development Company, a corporation of Delaware No Drawing. Application June 23, 1949, Serial No. 100,969

7 Claims. (Cl. 252—40)

This invention relates to an improved lubricating grease composition and more particularly to a lubricating grease composition suitable for high temperature service which is mechanically and thermally stable up to its dropping point and is suitable for service in wet conditions at high temperatures.

In the prior art, numerous lubricating greases have been proposed having various characteristics such as high temperature consistency, resistance to leaking or oil separation, resistance to oxidation, water-proof properties and the like. As a general rule, such compositions have been prepared by incorporating into a suitable lubricating oil, usually a mineral oil base, a metallic soap of fatty oils or fatty acids which has the property of thickening the lubricating oil to a grease-like consistency. In many applications of lubricating compositions, the conditions of use are such that liquid compositions are unsatisfactory because they run out of bearings or other parts to be lubricated unless a suitable oil sump is provided or they are readily washed away or otherwise rendered ineffective. Moreover they do not furnish a good seal against dirt and dust. For such purposes lubricating greases have an important field of use, it being particularly important that during all types of use they retain a given required consistency so as to remain in place and perform their lubricating and sealing functions. A particular application of lubricating grease, for example, is their use in ball and roller bearings. In many instances anti-friction bearings run at fairly high temperatures and due either to the high temperatures or to the churning action of the bearings, or both, many types of greases become too soft or fluid at elevated temperatures to remain in situ and properly perform their lubricating functions. For such purposes high temperature greases of stable structure are usually required, that is, greases which do not melt or separate oil from the thickener at temperatures as high as 350° F. to 400° F. for example. At the same time, the grease must be capable of giving adequate lubrication at much lower temperatures. Obviously they must not be too hard or stiff to give proper protection at ordinary temperatures even though their principal use is for high temperature operation.

It has been customary in the past to raise the melting point of certain greases, for example, sodium soap greases, by increasing the percentage of soap employed in the lubricant. This may be satisfactory for some purposes, but frequently it is objectionable for the reason just suggested, that is, that such greases are too stiff for satisfactory lubrication at normal starting temperatures requiring excessive torque and resulting in unsatisfactory performance where operation may proceed for appreciable periods of time at low or even normal temperatures.

Many of the purposes for which high temperature lubricants are required involve other adverse operating conditions. For example, in many cases there is a marked tendency to oxidation and some tendency to deteriorate because of moisture in a humid atmosphere or water may be present in liquid form which tends to leach out the soap from the oil allowing the lubricant to leak away from the bearing and leave the bearing surface unprotected.

In the past, lubricating greases thickened with calcium soap of high molecular weight fatty acids have given excellent service under wet conditions and are stable to mechanical working. However, the removal of structural water from these greases at temperatures of over 212° F. or at lower temperatures, due to the evaporation of the water, results in a complete disintegration of the grease structure. Therefore, these calcium soap thickened lubricating greases are, for the most part, limited to services below 210° F.

Lubricating greases thickened with lithium soaps such as lithium stearate also are resistant to the washing action of water and have high melting points. However, under mechanical working they tend to break down to soft fluid masses with a corresponding loss of structure. At temperatures above about 200° F. they also tend to become rubbery and stringy and of a structure unsuitable for the satisfactory lubrication of moving parts.

The mixed base greases of calcium and lithium soaps prepared from high molecular weight fatty acids compromise the good and bad qualities of the greases prepared from the separate soaps resulting in products which, although desirable for many uses, from an over-all standpoint are not outstanding and are generally unsuitable for all around all-purpose use.

It has recently been found that greases prepared from a combination of the alkali metal salt of a low molecular weight unsaturated acid and the alkaline earth soap of a high molecular weight saturated fatty acid have exceptional properties as to structure stability at high temperatures and under moist conditions at high temperatures.

In general, mixed base greases have been prepared by the blending of fatty acids and mineral oil in a grease kettle and raising the temperature to one at which the solid fatty material becomes liquid. Thereafter the metallic hydroxide has been added to the blend in the grease kettle, thereby forming the metallic soap thickeners.

However, in forming a mixed base grease prepared from the combination of a low molecular weight unsaturated acid salt and a soap formed from a high molecular weight substantially saturated fatty acid, it has been found that the direct neutralization of low molecular weight unsaturated acid with an alkali metal hydroxide, in the presence of high molecular weight soap previously prepared, results in soaps or salts which are not easily dispersible in mineral oil. To overcome this disadvantage, according to the present invention, the low molecular weight unsaturated acid is first neutralized with the alkali metal hydroxide to form the low molecular weight salt prior to the formation of the high molecular weight substantially saturated alkaline earth soap. If a material such as a nitrile which is capable for forming the low molecular weight acid is used, it is first contacted with an aqueous solution of the alkali metal hydroxide in order to bring about hydrolysis of the nitrile and to neutralize the acid thus formed. Then the high molecular weight substantially saturated alkaline earth soap is formed.

Accordingly, it is the object of this invention to compound a mixed base lubricating grease prepared from an alkaline earth soap of a high molecular weight fatty acid and an alkali metal soap of a low molecular weight unsaturated acid.

The invention has as a further object a new process for the manufacture of a mixed base grease.

In brief the invention comprises admixing the desired amount of a mineral oil base stock with the desired amount of a low molecular weight unsaturated acidic or acidogenic material and charging the mixture to a grease kettle. This mixture is agitated and during the agitation the desired amount of alkali metal hydroxide in water solution is added to the mixture. The resulting mixture is stirred to maintain an emulsion until the neutralization of the acid or acidogenic material by the alkali metal hydroxide is concluded. After the neutralization of the acid or acidogenic material is complete the high molecular weight substantially saturated fatty material is added. Such fatty material is preferably admixed with a second portion of the desired mineral oil and the mixture is then added to the salt containing mixture. The mass is then heated to insure that all of the fatty material is in solution. When the solution of the latter is complete, a slurry of the balance of the mineral oil and an alkaline earth base sufficient in amount to completely neutralize the fatty acid, is added to the mass. The temperature is then raised until dehydration is complete and then the grease composition is allowed to cool.

In the preferred embodiment of this invention hydrogenated fish oil acids are used to prepare the soaps. These are predominantly $C_{16}$ to $C_{20}$ acids which are substantially saturated. It is to be understood, of course, that other high molecular weight fatty materials may be used such as hydroxy stearic acid, stearic acid, or any of the saturated fatty acids commonly used in grease manufacturing or mixtures of these. These materials may be employed with or without the addition of a polyethylene glycol plasticizer.

The low molecular weight unsaturated aliphatic acidogenic material is preferably acrylonitrile. However, acrylic acid, methacrylic acid, or crotonic acid or the nitriles of these acids may be advantageously employed. Calcium hydroxide is preferred as the alkaline earth hydroxide; however, strontium or barium hydroxide or the corresponding oxides or carbonates may be employed.

The materials disclosed may be mixed in various proportions as will be apparent to those skilled in the art.

The quantities of the above disclosed materials added may vary widely depending upon the particular characteristics of the desired lubricating composition. For instance, the high molecular weight saturated fatty acid material may vary from about 10% to 20% by weight. The low molecular weight unsaturated acidogenic material may vary between about 2% to 4% by weight. The alkaline earth hydroxide may vary from about 1% to about 3% by weight. The alkali metal hydroxide may vary from about 1% to 3% by weight. However a mol ratio of the acids of 1:1 appear to be preferable.

The invention may be further described by reference to the following examples:

EXAMPLE 1

Formulation

| Ingredients: | Percent by weight |
|---|---|
| Hydrogenated fish oil acids | 16.7 |
| Acrylonitrile[1] | 3.3 |
| Hydrated lime | 2.5 |
| Lithium hydroxide monohydrate | 2.7 |
| Mineral oil (100 SSU at 100° F.) | 74.8 |
| | 100.0 |

[1] Contains small percentage of hydroquinone as polymerization inhibitor.

The acrylonitrile and one fourth of the mineral oil were charged to a fire heated grease kettle and while agitation, the lithium hydroxide (dissolved in twice its weight of boiling water) was added. After stirring for about one hour or until the odor of ammonia was noticeable, the hydrogenated fish oil acids were charged along with three fourths of the balance of the mineral oil and the mass heated to 150° F. The lime, slurried in the balance of the mineral oil, was added and the temperature raised to 400° F. The molten grease was drawn into pans for cooling and returned to the cold kettle for homogenizing and filtering.

Properties:
- Percent free alkalinity__ 0.44 (As $Ca(OH)_2$)
- Dropping point_____ 350° F.
- Worked penetration_____ 203 mm./10
- Penetration after 100,000 strokes in the ASTM worker employing fine hole plate_____ 240 mm./10

Boiling water test: Ten grams of grease placed in a beaker of boiling water for 2 hours. No turbidity of water or loss of grease structure.
Appearance: Smooth, uniform-glossy. Similar to calcium soap cup grease.

EXAMPLE 2

Formula

| Ingredients: | Percent by weight |
|---|---|
| Hydrogenated fish oil acids | 20.00 |
| Acrylonitrile | 4.00 |
| Hydrated lime | 3.00 |
| Lithium hydroxide monohydrate | 2.30 |
| Mineral oil (40 SSU at 210° F.) | 69.70 |

The acrylonitrile and one quarter of the mineral oil were charged to a cold steam-heated grease kettle and while mixing the lithium hydroxide dissolved in twice its volume of boiling water was added. When the odor of ammonia became noticeable the calcium hydroxide (lime) was added and thoroughly mixed into the mass.

The fish oil acid was then added and one-quarter of the balance of the oil, and the mass slowly heated to 220° F. driving off ammonia and water. When the mass became heavy the balance of the oil was added and the mass heated to 330° F. and materially dehydrated.

Properties:
- Penetration (6000 strokes) mm./10 _____ 236
- Penetration (100,000 strokes) mm./10 _____ 260
- Dropping point, °F _____ 320
- Boiling water solubility[1]:
  - Disintegration _____ None
  - Turbidity of Water _____ None
  - Appearance _____ Smooth, homogeneous

[1] Ten grams of grease placed in boiling water for one hour.

EXAMPLE 3

Formula

| Ingredients: | Percent by weight |
|---|---|
| Hydrogenated fish oil acids | 10.00 |
| Acrylonitrile | 2.00 |
| Hydrated lime | 1.50 |
| Lithium hydroxide monohydrate | 1.15 |
| Mineral oil (40 SSU at 210° F.) | 42.67 |
| Mineral oil (70 SSU at 210° F.) | 42.68 |

The grease represented by the above formula was made in exactly the same manner as that of Example 2.

Properties:
- Penetration (600 strokes) mm./10 _____ 300
- Penetration (100,000 strokes) mm./10 _____ 360
- Dropping point, °F _____ 302
- Boiling water solubility[1]:
  - Disintegration _____ None
  - Turbidity of water _____ None
  - Appearance _____ Smooth, homogeneous

[1] Ten grams of grease placed in boiling water for one hour.

As will be evident from an examination of the data given above the grease compositions made in accordance with the process of this invention have excellent high temperature characteristics, their dropping points varying from 302 to 350° F. They also have good structural stability as shown by the penetration tests. Their solubility in boiling water as shown by the boiling water solubility tests indicate that they are especially adaptable for use in conditions of high temperature in the presence of moisture.

Although in the examples given above the temperatures utilized for the preparation of the alkaline earth metal soaps are recited as being in the neighborhood of 150° and of 220° F., the formation of this soap may be carried out within a temperature range of from about 120 to 200° F. with 130 to 160° F. being the especially preferred range. The greases of the examples were dehydrated at temperatures of 330 and 400° F. Other dehydration temperatures within a range of from 300 to 450° F. may be used, a preferred range being 380° to 420° F. As is commonly known in the grease making art, these temperatures are approximate and slight variations may be made without alteration of the resulting grease composition.

It is to be understood, of course, that various additives known to the art, such as extreme pressure additives, anti-corrosion agents, oxidation inhibitors, viscosity index improvers and the like, may be incorporated into these grease compositions to increase their desirable characteristics.

In summation, this invention is concerned with a new process for manufacturing a superior grease composition which comprises mixing with a lubricating oil base stock the desired amount of a low molecular weight unsaturated aliphatic monobasic acidic or acidogenic material having from 3 to 4 carbon atoms and adding to the mixture of the oil and acid or acidogenic material enough of an alkali metal base, preferably in the form of hydroxide, oxide or carbonate to neutralize the acidic material thereby forming an alkali metal salt of the acidic material. The mixture is stirred until neutralization of the acidic material is completed. After the neutralization of the acidic material is completed a high molecular weight substantially saturated fatty acid mixed with additional lubricating oil is added and the temperature is raised to one insuring complete solubilization of the fatty material. A slurry of additional lubricating oil and an alkaline earth metal basic material is then added to the mixture and the temperature raised to the desired dehydration temperature.

What is claimed is:

1. A process for the manufacture of a mixed base lubricating grease composition which comprises admixing with a mineral base lubricating oil from about 2 to 4% by weight of an unsaturated aliphatic monobasic acidogenic material having from 3 to 4 carbon atoms selected from the class consisting of acrylic acid, methacrylic acid, crotonic acid, and their nitriles, adding to said mixture from 1 to 3% of an alkali metal hydroxide in aqueous solution to convert said acidogenic material to the alkali metal salt, stirring the mixture until the said acidogenic material is substantially completely neutralized thereafter adding from about 10 to 20% by weight of a high molecular weight saturated fatty acid in admixture with additional mineral oil, raising the temperature of the resulting mixture to one within a range of from about 120° F. to 170° F., adding to the said heated mixture a mineral oil slurry containing about 1 to 3% by weight of an alkaline earth metal hydroxide to neutralize said high molecular weight saturated fatty acid, raising the temperature of the resulting mixture to one within a range of from about 350° F. to 450° F., thereby dehydrating said mixture, and cooling the resulting grease composition.

2. A process for the manufacture of a mixed base lubricating grease composition which comprises admixing with a mineral base lubricating oil from about 2 to 4% by weight of acrylonitrile, adding to said mixture from about 1 to 3% by weight of an alkali metal hydroxide, stirring the mixture until the said acrylonitrile is substantially completely hydrolyzed and neutralized and thereafter adding from about 10 to 20% by weight of a high molecular weight saturated fatty acid in admixture with additional mineral oil, raising the temperature of the resulting mixture to one within a range of from about 130° F. to 160° F., adding to the said heated mixture a mineral oil slurry of about 1 to 3% by weight of an alkaline earth metal hydroxide to neutralize the said high molecular weight saturated fatty acid, raising the temperature of the resulting mixture to one within a range of from about 380° F.

to 420° F., thereby dehydrating said mixture, and cooling the resulting grease composition.

3. A process for the manufacture of a mixed base lubricating grease composition which comprises admixing with a mineral base lubricating oil from about 2 to 4% by weight of acrylonitrile, adding to said mixture from about 1 to 3% by weight of lithium hydroxide monohydrate, stirring the mixture until the said acrylonitrile is substantially completely hydrolyzed and neutralized and thereafter adding from about 10 to 20% by weight of a high molecular weight saturated fatty acid in admixture with additional mineral oil, raising the temperature of the resulting mixture to one within a range of from about 130° F. to 160° F., adding to the said heated mixture a mineral oil slurry of about 1 to 3% by weight of an alkaline earth metal hydroxide in aqueous solution to neutralize the said high molecular weight saturated fatty acid, raising the temperature of the resulting mixture to one within a range of from about 380° F. to 420° F., thereby dehydrating said mixture, and cooling the resulting grease composition.

4. A process for the manufacture of a mixed base lubricating grease composition which comprises admixing with a mineral base lubricating oil from about 2 to 4% by weight of acrylonitrile, adding to said mixture from about 1 to 3% of lithium hydroxide monohydrate, stirring the mixture until the said acrylonitrile is substantially completely hydrolyzed and neutralized and thereafter adding from about 10 to 20% by weight of a mixture of hydrogenated fish oil acids in admixture with additional mineral oil, raising the temperature of the resulting mixture to one within a range of from about 130° F. to 160° F., adding to the said heated mixture a mineral oil slurry of about 1 to 3% by weight of an alkaline earth metal hydroxide in aqueous solution to neutralize the said hydrogenated fish oil acids, raising the temperature of the resulting mixture to one within a range of from about 380° F. to 420° F., thereby dehydrating said mixture, and cooling the resulting grease composition.

5. A process for the manufacture of a mixed base lubricating grease composition which comprises admixing with a mineral base lubricating oil from about 2 to 4% by weight of acrylonitrile, adding to said mixture from about 1 to 3% by weight of lithium hydroxide monohydrate, stirring the mixture until the said acrylonitrile is substantially completely hydrolyzed and neutralized and thereafter adding from about 10 to 20% by weight of a mixture of hydrogenated fish oil acids admixed with additional mineral oil, raising the temperature of the resulting mixture to one within a range of from 130° F. to 160 F., adding to the said heated mixture a mineral oil slurry of about 1 to 3% by weight of calcium hydroxide, raising the temperature of the resulting mixture to one within a range of from about 300° F. to 340° F., thereby dehydrating said mixture, and cooling the resulting grease composition.

6. A process for the manufacture of a mixed base lubricating grease composition which comprises admixing in a steam heated grease kettle with a mineral oil base lubricating oil from about 2 to 4% by weight of acrylonitrile, adding to said mixture from about 1 to 3% by weight of lithium hydroxide monohydrate, stirring the mixture until the said acrylonitrile is substantially completely hydrolyzed and neutralized and thereafter adding from about 10 to 20% by weight of a mixture of hydrogenated fish oil acids admixed with additional mineral oil, raising the temperature of the resulting mixture to one within a range of from about 150 to 200° F., adding to the said heated mixture a mineral oil slurry of about 1 to 3% by weight of calcium hydroxide, raising the temperature of the resulting mixture to one within a range of from 300 to 330° F., thereby substantially dehydrating said mixture, and cooling the resulting grease composition.

7. A process for the manufacture of a mixed base lubricating grease composition which comprises admixing with a mineral base lubricating oil about 3.3% by weight of acrylonitrile, adding to said mixture about 2.7% by weight of lithium hydroxide monohydrate, stirring the mixture until the said acrylonitrile is substantially completely hydrolyzed and neutralized and thereafter adding about 16.7% by weight of a mixture of hydrogenated fish oil acids in admixture with additional mineral oil, raising the temperature of the resulting mixture to about 150° F., adding to the said heated mixture a mineral oil slurry of about 2.5% by weight of calcium hydroxide, raising the temperature of the resulting mixture to about 400° F., thereby dehydrating said mixture, and cooling the resulting grease composition.

ARNOLD J. MORWAY.

REFERENCES CITED

The following references are of record in the file of this patent:

UNITED STATES PATENTS

| Number | Name | Date |
|---|---|---|
| 2,468,099 | Morway | Apr. 26, 1949 |